UNITED STATES PATENT OFFICE.

EDWARD R. STOWELL, OF ODEN, MICHIGAN.

PROCESS FOR THE FABRICATION OF A HEAT AND ACID PROOF PAINT OR COATING.

1,164,670.   Specification of Letters Patent.   Patented Dec. 21, 1915.

No Drawing.   Application filed October 1, 1914. Serial No. 864,534.

*To all whom it may concern:*

Be it known that I, EDWARD R. STOWELL, a citizen of the United States, and a resident of Oden, in the county of Emmet, in the State of Michigan, have invented and discovered a new and useful Process for the Fabrication of a Heat and Acid Proof Paint or Coating, of which the following is a specification.

The object of this invention is to furnish a paint or coating which can be used to protect brick and other clay products, metal, concrete, etc., from the fusing and disintegrating action of high temperatures, and to furnish a fire resisting prime coat or filler for wood, canvas and fiberboards, the said paint or coating to be made suitable for packing into sealed containers by the process below set forth.

This process consists in the mixing together of carbid of silicon (carborundum powder) and liquid sodium silicate (water-glass) to the consistency of a paste or very thick syrup, then subjecting same to a temperature of from 80 to 100 degrees F. until the composition has passed through a gas forming stage, then reducing to the desired consistency by the admixture of water and packing into sealed containers for future use.

When carbid of silicon or powdered carborundum is mixed with sodium silicate a gas is formed, due to the reaction of the caustic alkali contained in the sodium silicate with the free silicon or silicon compounds contained in the carborundum, the said formation being hydrogen gas. When packed in sealed containers this gas will either explode the container, causing loss of contents, or escape with considerable force when the container is unsealed. To prevent this the mixed composition is placed in an ample container, filling same but one half full, covered but not air tight, and subjected to a temperature of 80 to 100 degrees F. until all gas has generated and escaped, the mixture being then reduced to the desired consistency by the admixture of a small amount of water, and packed into sealed containers.

Having described the composition and the process for the fabrication of the same, what I claim as my invention and discovery and wish to secure by Letters Patent is—

1. The herein described process for mixing carbid of silicon and liquid sodium silicate, placing same in an ample container and subjecting to a temperature of from 80 to 100 degrees F. to cause the formation and escape of the hydrogen gas, before packing in sealed containers.

2. The herein described process for mixing together carbid of silicon (carborundum powder) and liquid sodium silicate (waterglass) to a paste, placing same in an ample container subjecting it to a temperature of 80 to 100 degrees F. to hasten the formation of the hydrogen gas, caused by the reaction of the caustic alkali in the sodium silicate on the free silicon or silicon compounds contained in the carbid of silicon or carborundum powder, then reducing to the desired consistency by the admixture of a small amount of water and packing into sealed containers.

In testimony whereof I have signed my name in the presence of two subscribing witnesses.

EDWARD R. STOWELL.

Witnesses:
 PERRY FRAIZER,
 DAN MONROE.

Copies of this patent may be obtained for five cents each, by addressing the "Commissioner of Patents, Washington, D. C."